3,345,277
ELECTROCHEMICAL PRODUCTION OF SULFUR HEXAFLUORIDE

Paul E. Ashley, Minneapolis, James Donald La Zerte, St. Paul, and Raymond J. Seffl, East Oakdale Township, Washington County, Minn., assignors to Minnesota Mining and Manufacturing Company, St. Paul, Minn., a corporation of Delaware
No Drawing. Filed Sept. 24, 1964, Ser. No. 402,681
3 Claims. (Cl. 204—59)

This invention relates to a new and very useful process for the production of sulfur fluorides, especially sulfur hexafluoride ($SF_6$).

In one embodiment this invention relates to an electrochemical process for making $SF_6$ by electrolyzing in a cell containing an electrode pack, a substantially anhydrous mixture of elementary sulfur and liquid hydrogen fluoride.

This invention provides a process for producing high purity $SF_6$, a gaseous dielectric, from low priced readily available starting materials. This process yields in one step a product where the sulfur has its highest valence state thus eliminating the need for low valence state raw materials. Since the process can be conducted in a conventional electrochemical cell, it bypasses the problems of handling elementary fluorine—hydrogen fluoride and sulfur being the starting materials. Hydrogen fluoride, as is well known, is routinely handled on a daily basis in commercial operations using the electrochemical cell. Since the process produces $SF_6$ at high rates from cheap starting materials, it is economically attractive for industrial utilization.

Sulfur hexafluoride is useful as an electrical insulating agent, especially for high voltages. It is also useful as an intermediate for reaction with carbon; see, for example U.S. Patent No. 2,709,186. Heretofore sulfur hexafluoride ($SF_6$) has been prepared by a variety of ways including electrolysis of anhydrous hydrogen fluoride with a covalent sulfur compound; see, for example, U.S. Patent No. 2,717,235. However, because of low yields, high cost and safety factors so far as is known to us, all known prior art methods have serious disadvantages, particularly from a commercial standpoint.

Accordingly, an object of this invention is to provide an improved process for the production of sulfur hexafluoride.

Another object of this invention is to provide a method for the preparation of sulfur hexafluoride directly from elementary sulfur and hydrogen fluoride in an electrochemical cell.

Another object is to provide a method for using the electrochemical cell to make sulfur hexafluoride.

Another object of this invention is to provide a one-step process for producing high purity sulfur hexafluoride ($SF_6$) from low-priced raw materials by electrofluorination.

Other and further objects and advantages of the present invention will become apparent to those skilled in the art from the accompanying description and disclosure.

As indicated, the present invention employs as the essential starting material elementary sulfur. The preferred sulphur is in powdered form having an average mesh size of less than about 100. Also, the sulfur is preferably substantially anhydrous and is preferably chemically pure, particularly when one desires a chemically pure product.

The electrochemical process for making fluorine-containing carbon compounds is disclosed in Simons U.S. Patent No. 2,519,983; Scholberg et al. U.S. Patent No. 2,717,871; Brice et al. U.S. Patent No. 2,732,398; and pages 417–418 of the book entitled Fluorine Chemistry, volume I, edited by J. H. Simons, published by Academic Press, Inc., 1950.

The theoretical voltage required to obtain fluorine from anhydrous hydrogen fluoride is given in the literature to be 2.77 volts. The process of this invention is conventionally carried out at voltages above those sufficient theoretically to generate free fluorine from anhydrous hydrogen fluoride. A potential in the neighborhood from about 4 to 8 volts is commonly employed since electrode processes are far from reversible and since higher voltages can give fluorine which reacts explosively if any organic compound is present or with the hydrogen formed during the electrolysis.

In the process of the present invention it has been found that voltages as high as 40 volts and preferably in the range of from about 4 to 10 volts can be used without cell explosions since there are no organic compounds present.

On the other hand while some sulfur hexafluoride is produced at cell voltages as low as 3 volts, as indicated above, it is preferred to operate at voltages in the range of at least 4 to 8 volts.

When operating a cell under voltage conditions as above described the direct current can be in the range of from about 5 to 35 amperes, though those skilled in the art will appreciate that amperage as high as 40,000 amperes will be employed in large scale commercial electrolytic cells— the amperage used in any given cell being a function of the size of the cell.

Commonly a cell is operated at the boiling point of the electrolyte the pressure being adjusted depending upon the temperature employed. As a practical matter temperatures in the range of from about −20° to 40° C. can be employed and pressures up to about 45 p.s.i.g. can be employed or even higher depending upon the design of the particular cell used. Preferably electrolysis is conducted at temperatures in the range of from about −5° to 20° C. by circulating a coolant, conveniently at a temperature in the range of from about −30° to 0° C., around the outside of the cell.

Because sulfur hexafluoride leaves the cell as an effluent gas it is convenient to collect it by condensation in cold traps. As a practical matter it is convenient to pass the exit gas mixture through a refrigerated condenser to condense out most of the hydrogen fluoride vapors that are evolved, and the liquefied hydrogen fluoride is then drained back into the cell.

The sulfur hexafluoride, being lower boiling than hydrogen fluoride, is condensed in cold traps. It can be purified by redistillation in a low temperature still to obtain substantially pure sulfur hexafluoride.

Sulfur hexafluoride is a highly inert colorless and odorless gas. It is unaffected below a red heat by contact with a variety of chemicals including oxygen, copper, magnesium and other metals. It is decomposed only slowly even by powerful electrical discharge. By virtue of its great resistance to attack, sulfur hexafluoride is employed commercially as an inert blanketing material for electrical transformers, etc.

It is a surprising fact that one can form sulfur hexafluoride directly from elemental particulate sulfur and anhydrous hydrogen fluoride, particularly since elemental sulfur is substantially completely insoluble in anhydrous liquid hydrogen fluoride so that one would naturally expect that no electrochemical reaction could occur between the solid sulfur and the liquid hydrogen fluoride at the anode surface. It is for this reason that prior methods involving electrolytic methods have invariably employed covalent sulfur compounds such as hydrogen sulfide, sulfur dichloride, sulfur monochloride as the starting materials. See, for example British Patent No.

835,784, U.S. Patent No. 2,904,476 and German Patent No. 1,054,971.

It is also very surprising that one can obtain from an anhydrous hydrogen fluoride containing elemental sulfur in an electrolytic cell sulfur hexafluoride in purities ranging from about 80 to 95% purity. Further, in the prior art processes, the current efficiency has generally ranged from 40 to 50% (see, for example, British Patent No. 835,784) whereas in the present process current efficiencies range from 67 to more than 90%.

It is preferred to use anhydrous starting materials so as to exclude moisture from the cell during electrolysis because production of $OF_2$ and $SOF_2$ is thereby avoided, these being the end products of undesired side reactions occurring when moisture is present.

The following example is recited as a better understanding of the present invention and should not be construed as unnecessarily limiting thereto.

*Example*

Equipment used consisted of a standard 40 ampere cell having a nickel-nickel electrode pack, modified to accommodate a vibrator agitator such as the Vibro-Mixer and an automated charger adapted to continuously or intermittently charge sulfur into the cell.

At the start of the run the cell and condenser were flushed with HF, which was discarded. The cell was then charged about ⅔ full of HF and 200 g. of anhydrous sulfur and 5 g. anhydrous LiF (conductivity aid) were added. The Vibro-Mixer was turned on and HF charging completed. Total HF charge was about 4½ lbs. The sulfur used is 99.9% pure flowers of sulfur.

After the cell is thus initially charged, the D.C. power is turned on and the pressure increased to about 6 to 7 p.s.i.g. with nitrogen. Operation is then continued using 35 amperes of current and voltages in the range of from about 5.8 to 7.7 volts continuously for 163 hours. During this period sulfur is fed both continuously and intermittently, the average rate being about 7 to 8 grams per hour.

The product gas stream from the cell during this electrolysis is water washed by passage through a scrubber to remove residual hydrogen fluoride. Next the gas is washed with a solution of aqueous ammonium hydroxide and finally is washed with dilute sulfuric acid in order to remove such impurities as $SOF_2$, $SF_4$ and the like. The resulting gas is dried and analyzed by conventional gas liquid chromatography.

During the run the product gas stream is intermittently analyzed by conventional gas liquid chromatography using either the water washed or aqueous $NH_4OH$ and $H_2SO_4$ washed gas stream. Simultaneously samples of the product gas stream were intermittently taken from both such gas streams in order to obtain product data for the preparation of Table I below. The procedure involved making a gas liquid chromatography analysis usually just prior to a collection or immediately after such so as to obtain more reliable data. The results are tabulated in the table below.

TABLE

| Run time, hrs. | Voltage/ Amperage | P.s.i.g.[1] | G. L. C. Analysis[3] | | | | Total[5] g./50 AH | Method of cleaning[6] | Remarks |
|---|---|---|---|---|---|---|---|---|---|
| | | | LB[2] | $SF_6$ | $SOF_2/SF_4$ | HB[4] | | | |
| 5.5 | 6.0/35.2 | 6 | 3.9 | 94.6 | | 1.5 | | (1)+(2) | $SOF_2$ and $SF_4$ appear under one peak in G. L. C. curve. |
| 5.9 | 5.6/35.0 | 6 | .5 | 70.0 | 27.0 | 2.5 | | (1) | |
| 23.7 | 6.7/35.0 | 6¼ | .4 | 72.6 | 23.9 | 3.0 | | (1) | |
| 24.9 | 6.7/35.0 | 6¼ | .4 | 98.6 | | 1.1 | | (1)+(2) | |
| 28.6 | 6.7/35.0 | 6¼ | .4 | 98.4 | | 1.3 | 30.5 | (1)+(2) | |
| 29.7 | 6.8/35.3 | 6¼ | .8 | 97.8 | | 1.5 | | (3) | |
| 47.3 | 6.6/35.3 | 6¾ | .8 | 83.7 | .5 | 15.0 | 36.7 | (4) | |
| 72.5 | 6.7/35.0 | 7.0 | .4 | 85.1 | 11.6 | 3.3 | | (5) | |
| 77.0 | 6.5/35.0 | 7.0 | .3 | 89.6 | 5.0 | 5.3 | 41.0 | (5) | |
| 80.0 | 6.5/35.0 | 7.0 | .7 | 88.6 | 7.4 | 3.1 | | (5) | |
| 82.3 | 6.1/35.3 | 7.0 | .4 | 87.1 | 8.6 | 3.6 | | (5) | |
| 104.9 | 6.5/35.0 | 6¾ | .5 | 98.5 | | 1.0 | 32.5 | (5) | |
| 109 | 5.9/35.0 | 5¼ | .4 | 90.6 | 5.6 | 3.2 | [7]35.5 | (6) | |
| 134.5 | 6.5/35.0 | 7 | .5 | 98.1 | | 1.2 | 30.9 | (5) | |
| 162.8 | 7.6/32.1 | 7 | .4 | 97.9 | | 1.4 | [8]36.6 | (6) | |
| | | | | | | | ([9]) | (6) | |

[1] Pounds per square inch.
[2] Low boiler.
[3] Gas-liquid chromatography.
[4] High boiler.
[5] Total grams per 50 ampere hour.
[6] Key of symbols:
 (1) Catalyst Tube+NaF furnace in line.
 (2) $NH_3+H_2SO_4$ wash.
(3) Catalyst tube and water wash+$NH_3$ wash+$H_2SO_4$.
(4) Catalyst tube+water wash.
(5) Water wash only.
(6) Water wash+$NH_3$+$H_2SO_4$ wash.
[7] Average of three collections (35.4; 35.5; 35.5/50 AH).
[8] Average of three 1 hr. collections.
[9] Theory, 45.4 g./50 AH.

Having described our invention, we claim:

1. A process for electrochemically fluorinating sulfur which comprises electrolyzing a mixture of hydrogen fluoride and elemental sulfur in an electrochemical cell.

2. A process for the manufacture of sulfur hexafluoride comprising introducing powdered elemental sulfur into anhydrous hydrogen fluoride in an electrochemical cell and conducting electrolysis while maintaining voltages above those sufficient to generate free fluorine from anhydrous hydrogen fluoride while maintaining temperatures in the range of from about −20° to 40° C.

3. A process for the manufacture of sulfur hexafluoride comprising the steps of
   (a) introducing powdered elemental sulfur into anhydrous hydrogen fluoride in an electrochemical cell and conducting electrolysis while maintaining voltages above those sufficient to generate free fluorine from anhydrous hydrogen fluoride while maintaining temperatures in the range of from about −20° to 40° C., and
   (b) passing the exit gas mixture through a refrigerated zone to condense out substantially all of the hydrogen fluoride vapors and collecting gaseous sulfur hexafluoride.

References Cited

UNITED STATES PATENTS 2,717,235  9/1955  Prober _____ 204—59
2,904,476  9/1959  Man _____ 204—59
2,937,123  5/1960  Muetterties _____ 204—59

HOWARD S. WILLIAMS, *Primary Examiner.*